United States Patent
Han et al.

(10) Patent No.: US 12,365,792 B2
(45) Date of Patent: Jul. 22, 2025

(54) THERMOPLASTIC RESIN COMPOSITION, METHOD OF PREPARING THE SAME, AND MOLDED ARTICLE MANUFACTURED USING THE SAME

(71) Applicant: LG CHEM, LTD., Seoul (KR)

(72) Inventors: Seunghun Han, Daejeon (KR); Jinoh Nam, Daejeon (KR); Seong Lyong Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 322 days.

(21) Appl. No.: 17/774,412

(22) PCT Filed: Aug. 19, 2021

(86) PCT No.: PCT/KR2021/011001
§ 371 (c)(1),
(2) Date: May 4, 2022

(87) PCT Pub. No.: WO2022/092512
PCT Pub. Date: May 5, 2022

(65) Prior Publication Data
US 2023/0357559 A1 Nov. 9, 2023

(30) Foreign Application Priority Data
Oct. 29, 2020 (KR) .................. 10-2020-0141893
Aug. 13, 2021 (KR) .................. 10-2021-0107006

(51) Int. Cl.
| C08L 55/02 | (2006.01) |
| C08F 2/02 | (2006.01) |
| C08G 63/183 | (2006.01) |
| C08G 63/91 | (2006.01) |
| C08L 25/12 | (2006.01) |
| C08L 25/14 | (2006.01) |
| C08L 67/02 | (2006.01) |
| C08L 71/02 | (2006.01) |

(52) U.S. Cl.
CPC ............... *C08L 55/02* (2013.01); *C08F 2/02* (2013.01); *C08G 63/183* (2013.01); *C08G 63/916* (2013.01); *C08L 25/12* (2013.01); *C08L 25/14* (2013.01); *C08L 67/025* (2013.01); *C08L 71/02* (2013.01); *C08L 2205/035* (2013.01); *C08L 2207/04* (2013.01)

(58) Field of Classification Search
CPC .......... C08L 25/12; C08L 25/16; C08L 55/02; C08L 33/12; C08L 2205/025; C08L 2205/03; C08L 2205/035
See application file for complete search history.

(56) References Cited

U.S. PATENT DOCUMENTS
| 4,098,734 A | 7/1978 | Lee |
| 6,114,442 A | 9/2000 | Jung |
| 11,634,575 B2 | 4/2023 | Han et al. |
| 2003/0027898 A1 | 2/2003 | Eichenauer et al. |
| 2010/0261831 A1 | 10/2010 | Luinstra et al. |
| 2016/0312022 A1 | 10/2016 | Niessner et al. |
| 2019/0119487 A1 | 4/2019 | Michaelis De Vasconcellos et al. |
| 2020/0216653 A1 | 7/2020 | Kang et al. |

FOREIGN PATENT DOCUMENTS
| CN | 106084710 A | 11/2016 |
| CN | 111801382 A | 10/2020 |
| EP | 0297517 A2 | 1/1989 |
| JP | S62-205148 A | 9/1987 |
| JP | H09-132684 A | 5/1997 |
| JP | H11-152387 A | 6/1999 |
| KR | 10-2006-0131373 | 12/2006 |
| KR | 10-2006-0131373 A | 12/2006 |
| KR | 10-2013-0057795 A | 6/2013 |
| KR | 10-2013-0067516 A | 6/2013 |
| KR | 10-2015-0067714 | 6/2015 |
| KR | 10-2016-0101997 A | 8/2016 |
| KR | 10-2018-0068566 A | 6/2018 |
| KR | 10-2018-0076449 A | 7/2018 |

(Continued)

OTHER PUBLICATIONS

WO2020067664 English machine translation, prepared May 8, 2025. (Year: 2025).*
Extended European Search Report, dated Nov. 24, 2022, for the corresponding European Patent Application No. 21867906.6, 5 pages.
First Office Action dated May 29, 2023, issued in corresponding Japanese Patent Application No. 2022-521700.
Office Action issued Oct. 26, 2023 for corresponding Chinese Patent Application No. 202180005640.X Citation: KR 10-2020-0036301 A was previously cited in an IDS on May 4, 2022.

(Continued)

*Primary Examiner* — Christopher M Rodd
(74) *Attorney, Agent, or Firm* — Morgan, Lewis & Bockius LLP

(57) ABSTRACT

Disclosed are a thermoplastic resin composition, a method of preparing the same, and a molded article manufactured using the same, including a thermoplastic resin composition, including: a base resin; based on 100% by weight of the base resin, 7 to 17 parts by weight of a polyether ester elastomer resin (D); and 1.1 to 10 parts by weight of a modified polyester resin (E), the base resin including: 10 to 40% by weight of a vinyl cyanide compound-conjugated diene compound-aromatic vinyl compound graft copolymer (A); 18 to 52% by weight of a (meth)acrylic acid alkyl ester compound-α-methyl styrene-based compound-vinyl cyanide compound copolymer (B); and 13 to 55% by weight of an aromatic vinyl compound-vinyl cyanide compound copolymer (C), wherein the aromatic vinyl compound-vinyl cyanide compound copolymer (C) includes 10 to 25% by weight of a vinyl cyanide compound.

14 Claims, No Drawings

(56) References Cited

FOREIGN PATENT DOCUMENTS

| KR | 10-2018-0077435 A | 7/2018 | |
|----|-------------------|--------|---|
| KR | 10-2019-0110454 A | 9/2019 | |
| KR | 10-2020-0036301 A | 4/2020 | |
| KR | 10-2020-0101285   | 8/2020 | |
| WO | WO-2020067664 A1 * | 4/2020 | ........... C08G 63/183 |
| WO | 2020149504        | 7/2020 | |

OTHER PUBLICATIONS

International Search Report and Written Opinion issued in corresponding International Patent Application No. PCT/KR2021/011001 dated Nov. 24, 2021.

Sivaraman, P. et al. Polymer Testing—25 (2006) 562-567 "Fracture toughness of thermoplastic co-poly (ether ester) elastomer-Acrylonitrile butadiene styrene terpolymer blends".

\* cited by examiner

THERMOPLASTIC RESIN COMPOSITION, METHOD OF PREPARING THE SAME, AND MOLDED ARTICLE MANUFACTURED USING THE SAME

CROSS-REFERENCE TO RELATED APPLICATIONS

The present application is a U.S. National Stage of PCT/KR2021/011001, filed on Aug. 19, 2021, which claims priority to Korean Patent Application No. 10-2020-0141893, filed on Oct. 29, 2020, and Korean Patent Application No. 10-2021-0107006, re-filed on Aug. 13, 2021, based on the priority of the above patent, in the Korean Intellectual Property Office, the disclosures of each of which are incorporated herein by reference.

TECHNICAL FIELD

The present invention relates to a thermoplastic resin composition, a method of preparing the same, and a molded article manufactured using the same, and more particularly to a thermoplastic resin composition having excellent chemical resistance while having superior fluidity and superior mechanical properties such as impact resistance, and tensile strength, a method of preparing the same, and a molded article manufactured using the same.

BACKGROUND ART

A vinyl cyanide compound-conjugated diene compound-aromatic vinyl compound graft copolymer (hereinafter referred to as "an ABS-based resin") represented by an acrylonitrile-butadiene-styrene resin overcame low heat resistance and rigidity which are disadvantages of conventional high-impact polystyrene (HIPS) and exhibits superior properties, such as high impact resistance, chemical resistance, thermal stability, colorability, fatigue resistance, rigidity, and processability, particularly excellent processability. Due to such properties, an ABS-based resin is used as an interior/exterior material for automobiles, a material of office equipment, various electric/electronic product components, or toys, or the like.

In the case of a cup holder which is a kind of interior material for automobiles, there is a problem in that cracks occur due to contact with chemical products such as air freshener.

To address the problem, an acrylate-styrene-acrylonitrile copolymer grafted with a styrene-acrylonitrile copolymer having a high molecular weight; and a crystalline polymer were applied, but there is a problem of low impact resistance and fluidity.

Accordingly, there is a need for the development of a thermoplastic resin composition having superior impact resistance and fluidity while having excellent chemical resistance.

RELATED ART DOCUMENT

Patent Document

KR 2006-0131373 A

DISCLOSURE

Technical Problem

Therefore, the present invention has been made in view of the above problems, and it is one object of the present invention to provide a thermoplastic resin composition having excellent chemical resistance while having superior mechanical properties, such as superior impact resistance and tensile strength, and superior fluidity; a method of preparing the thermoplastic resin composition; and a molded article manufactured using the method.

The above and other objects can be accomplished by the present invention described below.

Technical Solution

In accordance with an aspect of the present invention, the above and other objects can be accomplished by the provision of a thermoplastic resin composition, including: a base resin; based on 100% by weight of the base resin, 7 to 17 parts by weight of a polyether ester elastomer resin (D); and 1.1 to 10 parts by weight of a modified polyester resin (E), the base resin including: 10 to 40% by weight of a vinyl cyanide compound-conjugated diene compound-aromatic vinyl compound graft copolymer (A); 18 to 52% by weight of a (meth)acrylic acid alkyl ester compound-α-methyl styrene-based compound-vinyl cyanide compound copolymer (B); and 13 to 55% by weight of an aromatic vinyl compound-vinyl cyanide compound copolymer (C), wherein the aromatic vinyl compound-vinyl cyanide compound copolymer (C) includes 10 to 25% by weight of a vinyl cyanide compound.

In accordance with another aspect of the present invention, there is provided a thermoplastic resin composition, including: a base resin; based on 100% by weight of the base resin, 7 to 17 parts by weight of a polyether ester elastomer resin (D); and 1.1 to 10 parts by weight of a modified polyester resin (E), the base resin including: 10 to 40% by weight of a vinyl cyanide compound-conjugated diene compound-aromatic vinyl compound graft copolymer (A); 18 to 52% by weight of a (meth)acrylic acid alkyl ester compound-α-methyl styrene-based compound-vinyl cyanide compound copolymer (B); 13 to 55% by weight of an aromatic vinyl compound-vinyl cyanide compound copolymer (C); and a bulk-polymerized vinyl cyanide compound-conjugated diene compound-aromatic vinyl compound copolymer (G), wherein the aromatic vinyl compound-vinyl cyanide compound copolymer (C) includes 10 to 25% by weight of a vinyl cyanide compound.

In accordance with still another aspect of the present invention, there is provided a thermoplastic resin composition, including: a base resin; based on 100% by weight of the base resin, 7 to 17 parts by weight of a polyether ester elastomer resin (D); 1.1 to 10 parts by weight of a modified polyester resin (E); and 0.3 to 5 parts by weight of an alkylene oxide copolymer (F), the base resin including: 10 to 40% by weight of a vinyl cyanide compound-conjugated diene compound-aromatic vinyl compound graft copolymer (A); 18 to 52% by weight of a (meth)acrylic acid alkyl ester compound-α-methyl styrene-based compound-vinyl cyanide compound copolymer (B); and 13 to 55% by weight of an aromatic vinyl compound-vinyl cyanide compound copolymer (C), wherein the aromatic vinyl compound-vinyl cyanide compound copolymer (C) includes 10 to 25% by weight of a vinyl cyanide compound.

In accordance with still another aspect of the present invention, there is provided a thermoplastic resin composition, including: a base resin; based on 100% by weight of the base resin, 7 to 17 parts by weight of a polyether ester elastomer resin (D); and 1.1 to 10 parts by weight of a modified polyester resin (E), the base resin including: 10 to 40% by weight of a vinyl cyanide compound-conjugated diene compound-aromatic vinyl compound graft copolymer (A); 18 to 52% by weight of a (meth)acrylic acid alkyl ester compound-α-methyl styrene-based compound-vinyl cyanide compound copolymer (B); and 13 to 55% by weight of an aromatic vinyl compound-vinyl cyanide compound copolymer (C), wherein the aromatic vinyl compound-vinyl cyanide compound copolymer (C) includes 10 to 25% by weight of a vinyl cyanide compound, wherein, in chemical resistance evaluation of fixing a specimen, which is made of the thermoplastic resin composition and has a size of 160*10*4 mm, to a curved jig having 2.0% strain, and applying a fragrance, Aroma Natural (product name) manufactured by Amway, in an amount of 0.1 cc to the specimen, followed by measuring a time at which the specimen is cracked, no crack is generated in the specimen even after 24 hours.

In accordance with still another aspect of the present invention, there is provided a method of preparing a thermoplastic resin composition, the method including: kneading and extruding a base resin; based on 100% by weight of the base resin, 7 to 17 parts by weight of a polyether ester elastomer resin (D); and 1.1 to 10 parts by weight of a modified polyester resin (E), under conditions of 200 to 300 and 200 to 700 rpm, the base resin including: 10 to 40% by weight of a vinyl cyanide compound-conjugated diene compound-aromatic vinyl compound graft copolymer (A); 18 to 52% by weight of a (meth)acrylic acid alkyl ester compound-α-methyl styrene-based compound-vinyl cyanide compound copolymer (B); and 13 to 55% by weight of an aromatic vinyl compound-vinyl cyanide compound copolymer (C), wherein the aromatic vinyl compound-vinyl cyanide compound copolymer (C) includes 10 to 25% by weight of a vinyl cyanide compound.

In accordance with still another aspect of the present invention, there is provided a method of preparing a thermoplastic resin composition, the method including: kneading and extruding a base resin; based on 100% by weight of the base resin, 7 to 17 parts by weight of a polyether ester elastomer resin (D); and 1.1 to 10 parts by weight of a modified polyester resin (E), under conditions of 200 to 300° C. and 200 to 700 rpm, the base resin including: 10 to 40% by weight of a vinyl cyanide compound-conjugated diene compound-aromatic vinyl compound graft copolymer (A); 18 to 52% by weight of a (meth)acrylic acid alkyl ester compound-α-methyl styrene-based compound-vinyl cyanide compound copolymer (B); 13 to 55% by weight of an aromatic vinyl compound-vinyl cyanide compound copolymer (C); and a bulk-polymerized vinyl cyanide compound-conjugated diene compound-aromatic vinyl compound copolymer (G), wherein the aromatic vinyl compound-vinyl cyanide compound copolymer (C) includes 10 to 25% by weight of a vinyl cyanide compound.

In accordance with still another aspect of the present invention, there is provided a method of preparing a thermoplastic resin composition, the method including: kneading and extruding a base resin; based on 100% by weight of the base resin, 7 to 17 parts by weight of a polyether ester elastomer resin (D); 1.1 to 10 parts by weight of a modified polyester resin (E); and 0.3 to 5 parts by weight of an alkylene oxide copolymer (F), under conditions of 200 to 300° C. and 200 to 700 rpm, the base resin including: 10 to 40% by weight of a vinyl cyanide compound-conjugated diene compound-aromatic vinyl compound graft copolymer (A); 18 to 52% by weight of a (meth)acrylic acid alkyl ester compound-α-methyl styrene-based compound-vinyl cyanide compound copolymer (B); and 13 to 55% by weight of an aromatic vinyl compound-vinyl cyanide compound copolymer (C), wherein the aromatic vinyl compound-vinyl cyanide compound copolymer (C) includes 10 to 25% by weight of a vinyl cyanide compound.

In accordance with still another aspect of the present invention, there is provided a method of preparing a thermoplastic resin composition, the method including: kneading and extruding a base resin; based on 100% by weight of the base resin, 7 to 17 parts by weight of a polyether ester elastomer resin (D); and 1.1 to 10 parts by weight of a modified polyester resin (E), under conditions of 200 to 300° C. and 200 to 700 rpm, the base resin including: 10 to 40% by weight of a vinyl cyanide compound-conjugated diene compound-aromatic vinyl compound graft copolymer (A); 18 to 52% by weight of a (meth)acrylic acid alkyl ester compound-α-methyl styrene-based compound-vinyl cyanide compound copolymer (B); and 13 to 55% by weight of an aromatic vinyl compound-vinyl cyanide compound copolymer (C), wherein the aromatic vinyl compound-vinyl cyanide compound copolymer (C) includes 10 to 25% by weight of a vinyl cyanide compound, wherein, in chemical resistance evaluation of fixing a specimen, which is made of the thermoplastic resin composition and has a size of 160*10*4 mm, to a curved jig having 2.0% strain, and applying a fragrance, Aroma Natural (product name) manufactured by Amway, in an amount of 0.1 cc to the specimen, followed by measuring a time at which the specimen is cracked, no crack is generated in the specimen even after 24 hours.

In accordance with yet another aspect of the present invention, there is provided a molded article including the thermoplastic resin composition.

Advantageous Effects

As apparent from the above description, the present invention provides a thermoplastic resin composition having excellent chemical resistance while having superior mechanical properties, such as superior impact resistance and tensile strength, and superior fluidity, and thus, being applicable as an interior/exterior material for automobiles; a method of preparing the thermoplastic resin composition; and a molded article manufactured using the method.

Specifically, the thermoplastic resin composition of the present invention has the advantage that cracks do not occur even after 24 hours in chemical resistance tests performed with a fragrance, Aroma Natural (product name), manufactured by Amway.

BEST MODE

Hereinafter, a thermoplastic resin composition according to the present disclosure, a method of preparing the same, and a molded article manufactured using the same are described in detail.

The present inventors confirmed that, when the base resin including a predetermined content of an aromatic vinyl compound-vinyl cyanide compound copolymer that includes a predetermined content of a vinyl cyanide compound, a vinyl cyanide compound-conjugated diene compound-aromatic vinyl compound graft copolymer, and a (meth)acrylic acid alkyl ester compound-α-methyl styrene-based compound-vinyl cyanide compound copolymer includes a predetermined content of a polyether ester elastomer resin and a modified polyester resin, mechanical properties, fluidity and chemical resistance are remarkably improved. Based on the finding, research was further performed, thus completing the present invention.

The thermoplastic resin composition of the present invention includes a base resin; based on 100% by weight of the base resin, 7 to 17 parts by weight of a polyether ester elastomer resin (D); and 1.1 to 10 parts by weight of a modified polyester resin (E), the base resin including: 10 to 40% by weight of a vinyl cyanide compound-conjugated diene compound-aromatic vinyl compound graft copolymer (A); 18 to 52% by weight of a (meth)acrylic acid alkyl ester compound-α-methyl styrene-based compound-vinyl cyanide compound copolymer (B); and 13 to 55% by weight of an aromatic vinyl compound-vinyl cyanide compound copolymer (C), wherein the aromatic vinyl compound-vinyl cyanide compound copolymer (C) includes 10 to 25% by weight of a vinyl cyanide compound. In this case, mechanical properties, such as impact resistance and tensile strength, and fluidity are superior and chemical resistance is excellent.

Now, each component of the thermoplastic resin composition of the present invention is described in detail.

(A) Vinyl Cyanide Compound-Conjugated Diene Compound-Aromatic Vinyl Compound Graft Copolymer (A) A vinyl cyanide compound-conjugated diene compound-aromatic vinyl compound graft copolymer according to the present disclosure may be included in an amount of, for example, 10 to 40% by weight, preferably 15 to 40% by weight, more preferably 20 to 35% by weight in the base resin. Within these ranges, mechanical strength, fluidity and property balance are excellent.

A) The vinyl cyanide compound-conjugated diene compound-aromatic vinyl compound graft copolymer may be a graft copolymer graft-polymerized with preferably 40 to 80% by weight of a conjugated diene rubber including a conjugated diene compound; 10 to 40% by weight of an aromatic vinyl compound; and 1 to 20% by weight of a vinyl cyanide compound. In this case, impact resistance is superior.

More preferably, the vinyl cyanide compound-conjugated diene compound-aromatic vinyl compound graft copolymer may be a graft copolymer graft-polymerized with 45 to 70% by weight of a conjugated diene rubber including a conjugated diene compound; 20 to 40% by weight of an aromatic vinyl compound; and 5 to 20% by weight of a vinyl cyanide compound. In this case, impact resistance is superior.

Even more preferably, the vinyl cyanide compound-conjugated diene compound-aromatic vinyl compound graft copolymer may be a graft copolymer graft-polymerized with preferably 50 to 65% by weight of a conjugated diene rubber including a conjugated diene compound; 20 to 35% by weight of an aromatic vinyl compound; and 5 to 15% by weight of a vinyl cyanide compound. In this case, impact resistance is superior.

The conjugated diene rubber has an average particle diameter of preferably 50 to 500 nm, more preferably 100 to 500 nm, even more preferably 150 to 400 nm, even more preferably 200 to 350 nm, most preferably 250 to 320 nm. Within these ranges, the properties, such as mechanical properties and colorability, of the thermoplastic resin composition are superior.

In the present disclosure, average particle diameter is measured by dynamic light scattering, and specifically, is measured as an intensity value using a Nicomp 380 particle size analyzer (manufacturer: PSS) in a Gaussian mode. As a specific measurement example, a sample is prepared by diluting 0.1 g of latex (TSC: 35 to 50 wt %) 1,000 to 5,000-fold with distilled water, i.e., a sample is diluted appropriately so as not to deviate significantly from an intensity setpoint of 300 kHz and is placed in a glass tube. Then, the average particle diameter of the sample is measured using a flow cell in auto-dilution in a measurement mode of dynamic light scattering/intensity 300 kHz/intensity-weight Gaussian analysis. At this time, setting values are as follows: temperature: 23° C.; measurement wavelength: 632.8 nm; and channel width: 10 μsec.

The conjugated diene compound may be, for example, one or more selected from the group consisting of 1,3-butadiene, 2,3-dimethyl-1,3-butadiene, 2-ethyl-1,3-butadiene, 1,3-pentadiene, isoprene, chloroprene and piperylene.

The aromatic vinyl compound may be, for example, one or more selected from the group consisting of styrene, α-methyl styrene, o-methyl styrene, ρ-methyl styrene, m-methyl styrene, ethyl styrene, isobutyl styrene, t-butyl styrene, o-bromo styrene, ρ-bromo styrene, m-bromo styrene, o-chloro styrene, ρ-chloro styrene, m-chloro styrene, vinyltoluene, vinylxylene, fluorostyrene and vinylnaphthalene.

The vinyl cyanide compound may be, for example, one or more selected from the group consisting of acrylonitrile, methacrylonitrile, ethacrylonitrile and derivatives thereof.

As a preferred example, the conjugated diene rubber may include one or more of butadiene polymers, butadiene-styrene copolymers, butadiene-acrylonitrile copolymers, ethylene-propylene copolymers, and polymers derived therefrom, without being limited thereto.

In the present disclosure, the derived polymer means a polymer prepared by copolymerizing another monomer or polymer not included in an original copolymer, or a polymer prepared by copolymerizing a derivative of the monomer.

In the present disclosure, the derivative is a compound produced by substituting a hydrogen atom or hydrogen atom group of an original compound with another atom or atom group, for example, refers to a compound produced by substitution with a halogen or an alkyl group.

The vinyl cyanide compound-conjugated diene compound-aromatic vinyl compound graft copolymer may be prepared, for example, by a known method including emulsion polymerization, suspension polymerization, bulk polymerization, and the like, preferably by emulsion polymerization.

A method of preparing the vinyl cyanide compound-conjugated diene compound-aromatic vinyl compound graft copolymer by emulsion polymerization may preferably include a step of continuously or batchwise adding a monomer mixture including 1 to 20% by weight of a vinyl cyanide compound and 10 to 40% by weight of an aromatic vinyl compound to a mixed solution including 40 to 80% by weight of a conjugated diene rubber, 0.1 to 5 parts by weight of an emulsifier, 0.1 to 3 parts by weight of a molecular weight regulator and 0.05 to 1 parts by weight of a polymerization initiator, based on 100 parts by weight of a total of the conjugated diene rubber, aromatic vinyl compound and vinyl cyanide compound included in the graft copolymer.

For example, the emulsifier may include one or more selected from the group consisting of allyl aryl sulfonates, alkali methyl alkyl sulfonates, sulfonated alkyl esters, fatty acid soap, and rosin acid alkali salts. In this case, polymerization stability may be excellent.

For example, the molecular weight regulator may include one or more selected from the group consisting of t-dodecyl mercaptan, n-dodecyl mercaptan, n-octyl mercaptan, and carbon tetrachloride, preferably t-dodecyl mercaptan.

For example, the polymerization initiator may include one or more selected from the group consisting of potassium persulfate, sodium persulfate, and ammonium persulfate. In this case, polymerization efficiency and the physical properties of a polymer to be prepared may be excellent.

For example, latex prepared by emulsion polymerization may be coagulated using one or more coagulants selected from the group consisting of sulfuric acid, $MgSO_4$, $CaCl_2$, and $Al_2(SO_4)_3$, and then the coagulated latex may be aged, dehydrated, and dried to obtain powdered latex.

Methods of preparing the vinyl cyanide compound-conjugated diene compound-aromatic vinyl compound graft copolymer are not particularly limited when using conditions, methods, and devices commonly used in the art to which the present invention pertains according to the definition of the present invention.

(B) (Meth)acrylic Acid Alkyl Ester Compound-α-Methyl Styrene-Based Compound-Vinyl Cyanide Compound Copolymer (B) The (meth)acrylic acid alkyl ester compound-α-methyl styrene-based compound-vinyl cyanide compound copolymer of the present disclosure may be included, for example, in an amount of 18 to 52% by weight, preferably 20 to 50% by weight, more preferably 25 to 45% by weight in the base resin. Within these ranges, all of impact resistance, fluidity and chemical resistance are excellent.

The copolymer (B) may include, for example, 30 to 55% by weight of a (meth)acrylic acid alkyl ester compound, 25 to 50% by weight of an α-methyl styrene-based compound and 10 to 30% by weight of a vinyl cyanide compound. Within these ranges, impact resistance, heat resistance and fluidity are excellent.

The copolymer (B) may include preferably 35 to 50% by weight of a (meth)acrylic acid alkyl ester compound, 30 to 45% by weight of an α-methyl styrene-based compound and 12 to 27% by weight of a vinyl cyanide compound. Within these ranges, impact resistance, heat resistance and fluidity are excellent.

The copolymer (B) may include more preferably 40 to 45% by weight of a (meth)acrylic acid alkyl ester compound, 35 to 40% by weight of an α-methyl styrene-based compound and 17 to 22% by weight of a vinyl cyanide compound. Within these ranges, impact resistance, heat resistance and fluidity are excellent.

The copolymer (B) may have, for example, a weight average molecular weight of 50,000 to 200,000 g/mol, preferably 70,000 to 150,000 g/mol, more preferably 80,000 to 120,000 g/mol. Within these ranges, mechanical properties, such as impact strength and tensile strength, and injection moldability are superior.

In the present disclosure, weight average molecular weight and number average molecular weight may be measured using tetrahydrofuran (THF) as an eluate through gel permeation chromatography (GPC, Waters Breeze). In this case, weight average molecular weight is obtained as a relative value to a polystyrene (PS) standard sample. Specific measurement conditions are as follows: solvent: THF, column temperature: 40° C., flow rate: 0.3 ml/min, sample concentration: 20 mg/ml, injection amount: 5 µl, column model: 1×PLgel 10 µm MiniMix-B (×4.6 mm)+1×PLgel 10 µm MiniMix-B (250×4.6 mm)+1×PLgel 10 µm MiniMix-B Guard (50×4.6 mm), equipment name: Agilent 1200 series system, refractive index detector: Agilent G1362 RID, RI temperature: 35° C., data processing: Agilent ChemStation S/W, and test method (Mn, Mw and PDI): OECD TG 118.

The (meth)acrylic acid alkyl ester polymer may be, for example, one or more selected from methacrylic acid alkyl ester and acrylic acid alkyl ester whose alkyl group has 1 to 20 carbon atoms, preferably 1 to 10 carbon atoms, preferably may be methyl methacrylate.

For example, the α-methyl styrene-based compound may include one or more selected from the group consisting of α-methyl styrene and derivatives thereof. In this case, heat resistance may be excellent.

The derivatives of α-methyl styrene may be preferably compounds in which one or more hydrogens of α-methyl styrene are substituted with a substituent such as an alkyl group having 1 to 10 carbon atoms and a halogen group, more preferably compounds in which one or more hydrogens in the aromatic ring of α-methyl styrene are substituted with a substituent such as an alkyl group having 1 to 10 carbon atoms and a halogen group.

The type and category of the vinyl cyanide compound included in the copolymer (B) may be the same as those of the vinyl cyanide compound included in the graft copolymer (A) of the present disclosure.

The copolymer (B) may be prepared, for example, by solution polymerization, bulk polymerization, emulsion polymerization or suspension polymerization, preferably by bulk polymerization.

Solution polymerization, bulk polymerization, emulsion polymerization and suspension polymerization commonly practiced in the art to which the present invention pertains may be used in the present invention without particular limitation.

(C) Aromatic Vinyl Compound-Vinyl Cyanide Compound Copolymer

The aromatic vinyl compound-vinyl cyanide compound copolymer (C) of the present disclosure may be included, for example, in an amount of 13 to 55% by weight, preferably 15 to 50% by weight, more preferably 20 to 45% by weight, in the base resin. Within these ranges, mechanical strength, fluidity and property balance are excellent.

Preferably, the aromatic vinyl compound-vinyl cyanide compound copolymer (C) may include 75 to 90% by weight of an aromatic vinyl compound and 10 to 25% by weight of a vinyl cyanide compound. In this case, fluidity of the thermoplastic resin composition is improved, so that processability and productivity are superior.

More preferably, the aromatic vinyl compound-vinyl cyanide compound copolymer (C) may include 75 to 85% by weight of an aromatic vinyl compound and 15 to 25% by weight of a vinyl cyanide compound. In this case, the thermoplastic resin composition exhibits superior processability, superior productivity, superior mechanical properties such as superior impact strength, superior heat resistance and superior colorability.

Even more preferably, the aromatic vinyl compound-vinyl cyanide compound copolymer (C) may include 75 to 80% by weight of an aromatic vinyl compound and 20 to 25% by weight of a vinyl cyanide compound. In this case, the thermoplastic resin composition exhibits superior processability, superior productivity, superior mechanical properties such as superior impact strength, superior heat resistance and superior colorability.

The aromatic vinyl compound-vinyl cyanide compound copolymer (C) may have a weight average molecular weight of preferably 50,000 to 200,000 g/mol, more preferably 80,000 to 180,000 g/mol, even more preferably 100,000 to 150,000 g/mol, even more preferably 120,000 to 150,000 g/mol. Within these ranges, desired fluidity can be obtained, so that processability, productivity, and the like are excellent and colorability is superior.

The aromatic vinyl compound-vinyl cyanide compound copolymer (C) may be prepared, for example, by bulk polymerization or emulsion polymerization. In terms of manufacturing cost, bulk polymerization is preferred.

A method of preparing the aromatic vinyl compound-vinyl cyanide compound copolymer (C) is not particularly limited when using conditions, methods, and devices commonly used in the art to which the present invention pertains according to the definition of the present invention.

(D) Polyether Ester Elastomer Resin

The polyether ester elastomer resin (D) of the present disclosure may be included, for example, in an amount of 7 to 17 parts by weight, preferably 7 to 15 parts by weight, more preferably 9 to 15 parts by weight based on 100 parts by weight of the base resin. Within these ranges, mechanical properties, heat resistance, fluidity and chemical resistance are superior.

A melt index, measured under conditions of 230° C. and 2.16 kg according to ASTM D1238, of the polyether ester elastomer resin (D) may be, for example, 0.1 to 10 g/10 min, preferably 1 to 10 g/10 min, more preferably 3 to 7 g/10 min. Within these ranges, the thermoplastic resin composition exhibits superior moldability and processability and improved chemical resistance.

The polyether ester elastomer resin (D) may be obtained, for example, by melt-polymerizing an aromatic dicarboxylic acid or an ester-forming derivative thereof; aliphatic diol; and polyalkylene oxide, and then solid-state-polymerizing the resultant product. Preferably, the resin is a random copolymer of a hard fraction formed from an aromatic dicarboxylic acid or an ester-forming derivative thereof and an aliphatic diol; and a soft fraction including a polyalkylene oxide as a main component.

The aromatic dicarboxylic acid may be, for example, one or more selected from the group consisting of terephthalic acid (TPA), isophthalic acid (IPA), 2,6-naphthalene dicarboxylic acid (2,6-NDCA), 1,5-naphthalene dicarboxylic acid (1,5-NDCA), 1,4-cyclohexane dicarboxylic acid (1,4-CHDA), dimethyl terephthalate (DMT) as aromatic dicarboxylates in which a diacid is substituted with a dimethyl group, dimethyl isophthalate (DMI), 2,6-dimethyl naphthalene dicarboxylate (2,6-NDC) and dimethyl 1,4-cyclohexanedicarboxylate (DMCD), preferably dimethyl terephthalate.

The aromatic dicarboxylic acid or an ester-forming derivative thereof may be included, for example, in an amount of 25 to 60% by weight, preferably 29 to 55% by weight, more preferably 34 to 45% by weight, based on 100% by weight of a total of the polyether ester elastomer resin. Within these ranges, reaction balance is superior.

In addition, the aliphatic diol may be preferably a diol having a number average molecular weight (Mn) of 300 g/mol or less, more preferably one or more selected from the group consisting of ethylene glycol, propylene glycol, 1,2-propanediol, 1,3-propanediol, 1,4-butane diol (1,4-BG), 1,5-pentanediol, 1,6-hexanediol, and 1,4-cyclohexanedimethanol (1,4-CHDM), even more preferably 1,4-butane diol.

The aliphatic diol may be included, for example, in an amount of 10 to 40% by weight, preferably 15 to 40% by weight, more preferably 20 to 30% by weight, based on 100% by weight of a total of the polyether ester elastomer resin. Within these ranges, reaction balance is superior.

The polyalkylene oxide is a unit constituting a soft fraction and may include an aliphatic polyether as a component. The polyalkylene oxide may be, for example, a unit derived from one or more selected from the group consisting of polyoxyethylene glycol, polypropylene glycol, poly(tetramethylene) glycol (PTMEG), polyoxyhexamethylene glycol, a copolymer of ethylene oxide and propylene oxide, an ethylene oxide-added polymer of polypropylene oxide glycol and a copolymer of ethylene oxide and tetrahydrofuran, preferably a unit derived from polytetramethylene glycol or an ethylene oxide-added polymer of polypropylene glycol.

The polytetramethylene glycol-derived unit may have a number average molecular weight of, for example, 600 to 3,000 g/mol, preferably 1,000 to 2,500 g/mol, more preferably 1,800 to 2,200 g/mol.

The ethylene oxide-added polymer-derived unit of the polypropylene glycol may, for example, a polypropylene glycol-derived unit whose terminal is capped with ethylene oxide, preferably may have a weight average molecular weight of 2,000 to 3,000 g/mol.

The polyalkylene oxide may be included, for example, in an amount of 10 to 60% by weight, preferably 15 to 55% by weight, more preferably 25 to 45% by weight, based on 100% by weight of a total of the polyether ester elastomer resin. Within these ranges, reaction balance is superior.

Preferably, the polyether ester elastomer resin (D) may include a branching agent. In this case, the melt viscosity and melt strength of an elastomer resin may be increased.

The branching agent may be, for example, one or more selected from the group consisting of glycerol, pentaerythritol, trimellitic anhydride, trimellitic acid, trimethylol propane and neopentyl glycol, preferably trimellitic anhydride.

The branching agent may be included, for example, in an amount of 0.05 to 0.1% by weight, preferably 0.05 to 0.09% by weight, more preferably 0.06 to 0.09% by weight, based on 100% by weight of a total of the polyether ester elastomer resin (D). Within these ranges, melt viscosity can be increased and, consequently, intrinsic viscosity during melt polymerization can be easily adjusted by adjusting the melt viscosity of an elastomer resin.

The polyether ester elastomer resin (D) of the present invention may be obtained, for example, by melt condensation polymerization, followed by solid-state polymerization.

Preferably, the polyether ester elastomer resin (D) may be obtained by transesterificating aromatic dicarboxylic acid, aliphatic diol, and polyalkylene oxide at 140 to 215° C. for about 100 to 150 minutes, particularly for 120 minutes, in the presence of a titanium butoxide (TBT) catalyst to generate a bis(4-hydroxy) butyl terephthalate (BHBT) oligomer, and then adding a TBT catalyst thereto again and performing melt polycondensation while reducing pressure from 215 to 245° C. step by step for 100 to 150 minutes, preferably for 120 minutes, from 700 to 800 torr preferably from 760 torr to 0.1 to 1 torr, preferably to 0.3 torr. The melt polycondensation may be performed until a melt flow index (MFI), measured at 230° C. under a load of 2.16 kg according to ASTM D1238, becomes 20 g/10 min or less. After completion of the reaction, pelletization may be performed by discharging from the reactor under nitrogen pressure to pelletize a strand.

Next, the pellet may be solid-state-polymerized under an inert atmosphere, such as nitrogen, or under vacuum for about 10 to 24 hours at 140 to 200° C. in a solid-state polymerization reactor or a rotatable vacuum dryer. The solid-state polymerization may be performed under high viscosity until a melt flow index (MFI) measured at 230° C. under a load of 2.16 kg becomes 10 g/10 min or less, preferably 1 to 10 g/10 min (230° C., 2.16 kg), more preferably 3 to 8 g/10 min (230° C., 2.16 kg), according to ASTM D1238.

The vacuum applied during the solid-state-polymerization is not particularly limited so long as it is within a range of being generally applied in the technical field to which the present invention pertains.

The hardness of the polyether ester elastomer resin (D) is expressed as shore hardness-D (shore D) measured according to ISO 868 and may be determined according to the content of polyalkylene oxide. To prepare the polyether ester elastomer resin (D) having a shore hardness of 35 to 50 D, preferably 40 to 50 D, polyalkylene oxide may be included in an amount of 10 to 60% by weight, preferably 15 to 55% by weight, more preferably 25 to 45% by weight, based on 100% by weight of a total of the polyether ester elastomer resin. Within these range, the polyether ester elastomer resin has good flexibility due to low hardness, and the heat resistance and compatibility of the resin itself are also superior.

(E) Modified Polyester Resin

The modified polyester resin (E) of the present disclosure may be included, for example, in an amount of 1.1 to 10 parts by weight, preferably 1.5 to 8 parts by weight, more preferably 2 to 7 parts by weight, based on 100 parts by weight of the base resin. Within these ranges, all of mechanical properties such as impact strength and tensile strength, chemical resistance and fluidity are superior.

The modified polyester resin (E) may be, for example, an amorphous resin copolymerized by adding 1,4-cyclohexanedimethanol (CHMD) in an amount of 50% or more during polymerization of polyethylene terephthalate as a kind of a polyester resin. In this case, the modified polyester resin (E) is transparent. Preferably, a 1,4-cyclohexanedimethanol-derived unit may be included in an amount of 50% by weight or more. In this case, impact resistance and chemical resistance are excellent, molding can be performed in broad conditions, secondary processing can be easily performed, and environmental hormone substances are not contained.

In the present disclosure, "A compound-derived unit, % by weight" is not specifically limited so long as it is an compound-derived unit, % by weight, commonly defined in the technical field to which the present invention pertains and, for example, may mean % by weight of a total of A compound-derived compound or % by weight of a total of A compound participating in polymerization.

The modified polyester resin (E) may be particularly a glycol-modified polyethylene terephthalate (PETG) resin. In this case, transparency, fluidity, chemical resistance and mechanical properties are superior.

(F) Alkylene Oxide Copolymer

The alkylene oxide copolymer (F) may be included, for example, in an amount of 0.3 to 5 parts by weight, preferably 0.5 to 4 parts by weight, more preferably 0.5 to 2 parts by weight, based on 100 parts by weight of the base resin. Within these ranges, mechanical properties, impact resistance and fluidity are further improved. When the amount of the alkylene oxide copolymer (F) is less than the range, tensile strength and chemical resistance are decreased.

The alkylene oxide copolymer (F) may be, for example, a block copolymer including a first block, which includes an ethylene oxide-derived unit, and a second block which includes a propylene oxide-derived unit.

The alkylene oxide copolymer (F) may include, for example, the ethylene oxide-derived unit and the propylene oxide-derived unit in a weight ratio of 50:50 to 3:97, preferably 40:60 to 5:95, more preferably 30:70 to 10:90. Within these ranges, mechanical properties are superior.

Preferably, the alkylene oxide copolymer (F) may be a triblock copolymer represented by Formula 1 below:

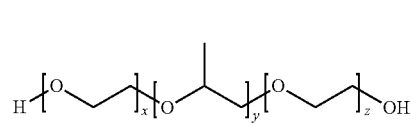

[Formula 1]

wherein x, y or z is respectively expressed as mol % based on 100 mol % of a total of x, y and z, x+y+z=100, 10≤x≤80, 10≤y≤50 and 10≤z≤80.

The weight average molecular weight of the alkylene oxide copolymer (F) may be, for example, 7,000 to 100,000 g/mol, preferably 7,500 to 9,500 g/mol, more preferably 80,000 to 90,000 g/mol. Within these ranges, chemical resistance are further improved.

The melt flow index of the alkylene oxide copolymer (F) measured under conditions of 190° C. and 2.16 kg according to ASTM D1238 may be, for example, 10 to 15 g/10 min, preferably 12 to 14 g/10 min. Within these ranges, processability are superior.

(G) Bulk-Polymerized Vinyl Cyanide Compound-Conjugated Diene Compound-Aromatic Vinyl Compound Copolymer The base resin may include the copolymer (G), for example, in an amount of 1 to 20% by weight, preferably 3 to 15% by weight, more preferably 5 to 10% by weight, based on a total weight of the sum of based on a total weight of the sum of the graft copolymer (A), the copolymer (B), the copolymer (C), the resin (D) and the bulk-polymerized vinyl cyanide compound-conjugated diene compound-aromatic vinyl compound copolymer (G). Within these ranges, fluidity and mechanical properties such as and tensile strength are further improved.

The bulk-polymerized vinyl cyanide compound-conjugated diene compound-aromatic vinyl compound copolymer (G) may be, for example, a bulk copolymer prepared by bulk polymerizing 5 to 20% by weight of a conjugated diene rubber including a conjugated diene compound, 55 to 85% by weight of an aromatic vinyl compound and 5 to 25% by weight of a vinyl cyanide compound, preferably a bulk copolymer prepared by bulk polymerizing 8 to 15% by weight of a conjugated diene rubber including a conjugated diene compound, 65 to 78% by weight of an aromatic vinyl compound and 13 to 22% by weight of a vinyl cyanide compound. Within these ranges, fluidity and tensile strength are further improved.

The conjugated diene rubber included in the bulk-polymerized vinyl cyanide compound-conjugated diene compound-aromatic vinyl compound copolymer (G) may have, for example, an average particle diameter of 1,000 to 2,000 nm, preferably 1,000 to 1,500 nm. Within these ranges, mechanical properties are superior.

As needed, the thermoplastic resin composition may selectively, further include one or more selected from the group consisting of a flame retardant, a hydrolysis stabilizer, a dye, a pigment, a colorant, an antistatic agent, a crosslinking agent, an antibacterial agent, a processing aid and a black masterbatch in an amount of 0.01 to 5 parts by weight, preferably 0.05 to 3 parts by weight, more preferably 0.1 to 2 parts by weight, even more preferably 0.5 to 1 parts by weight, each based on 100 parts by weight of the base resin. Within these ranges, necessary properties can be well implemented without deteriorating the original properties of the thermoplastic resin composition of the present disclosure.

Thermoplastic Resin Composition

The thermoplastic resin composition was subjected to chemical resistance evaluation wherein, for example, a specimen having a size of 160*10*4 mm is fixed to a curved jig having 2.0% strain, a fragrance, and then Aroma Natural (product name) manufactured by Amway is applied in an amount of 0.1 cc to the specimen, and then the time at which the specimen cracks is measured. In the evaluation, the specimen was not cracked after 24 hours. Accordingly, the thermoplastic resin composition has superior property balance and excellent chemical resistance, thereby being applicable as an interior material for automobiles.

In the present disclosure, "not cracked after 24 hours" means that no cracks are generated until 24 hours elapses.

To measure Charpy impact strength of a specimen with a thickness of 4 mm which is made of the thermoplastic resin composition, the specimen was notched according to ISO 179/1eA. Charpy impact strength of the specimen may be, for example, 26 kJ/m$^2$ or more, preferably 28 kJ/m$^2$ or more, more preferably 30 kJ/m$^2$ or more, even more preferably 30 to 35 kJ/m$^2$. Within these ranges, property balance is superior and application to automobile interiors is possible.

The melt flow index (MFI), which is measured under conditions of 220° C. and 10 kg according to ISO 1133, of the thermoplastic resin composition may be, for example, 15 g/10 min or more, preferably 20 g/10 min or more, more preferably 20 to 25 g/10 min. Within these ranges, fluidity is excellent, and thus, it is easy to mold in various shapes.

The tensile strength, which is measured under a condition of 500 mm/min according to ISO 527, a specimen with a thickness of 4 mm which is made of the thermoplastic resin composition may be, for example, 38 MPa or more, preferably 40 MPa or more, more preferably 40 to 45 MPa. Within these ranges, property balance is superior.

Method of Preparing Thermoplastic Resin Composition

A method of preparing the thermoplastic resin composition of the present disclosure includes a step of kneading and extruding 100 parts by weight of the base resin including 10 to 40% by weight of a vinyl cyanide compound-conjugated diene compound-aromatic vinyl compound graft copolymer (A), 18 to 52% by weight of a (meth)acrylic acid alkyl ester compound-α-methyl styrene-based compound-vinyl cyanide compound copolymer (B), and 13 to 55% by weight of an aromatic vinyl compound-vinyl cyanide compound copolymer (C) together with 7 to 17 parts by weight of a polyether ester elastomer resin (D) and 1.1 to 10 parts by weight of a modified polyester resin (E) under conditions of 200 to 300° C. and 200 to 700 rpm to prepare pellets, wherein the aromatic vinyl compound-vinyl cyanide compound copolymer (C) includes 10 to 25% by weight of a vinyl cyanide compound. In this case, fluidity and mechanical properties, such as impact resistance and tensile strength, are superior and chemical resistance is excellent.

The kneading and extruding may be performed, for example, using a single-screw extruder, a twin-screw extruder, and a Banbury mixer. In this case, a composition is uniformly dispersed, and thus, compatibility is superior.

The kneading and extruding may be performed at a barrel temperature of, for example, 200 to 300° C., preferably 210 to 290° C., more preferably 220 to 280° C., even more preferably 230 to 260° C. In this case, throughput per unit time is appropriate, sufficient melt kneading may be possible, and problems, such as thermal decomposition, of resin components do not occur.

The kneading and extruding may be performed, for example, under a condition of a screw rotation speed of 200 to 700 rpm, preferably 220 to 650 rpm, more preferably 300 to 600 rpm. In this case, process efficiency is superior due to appropriate throughput per unit time, and excessive cutting may be suppressed.

The method of preparing the thermoplastic resin composition contains all of the technical characteristics of the thermoplastic resin composition described above. Therefore, description of overlapping contents is omitted.

Molded Article

A molded article of the present disclosure may include the thermoplastic resin composition of the present disclosure. In this case, fluidity and mechanical properties, such as impact resistance and tensile strength, are superior and chemical resistance is excellent.

The molded article may be preferably an injection-molded article, more preferably an automobile interior or exterior material or a home appliance exterior material. In this case, the thermoplastic resin composition of the present disclosure can provide higher quality than quality required in the market.

A method of manufacturing the molded article of the present disclosure is not specifically limited when using conditions, methods, and apparatuses commonly used in the technical field to which the present invention pertains, within the scope of the present invention.

In describing the thermoplastic resin composition of the present invention, the method of preparing the same, and the molded article including the same, other conditions or equipment that are not explicitly described may be appropriately selected without particular limitation within the range commonly practiced in the art.

Now, the present disclosure will be described in more detail with reference to the following preferred examples. However, these examples are provided for illustrative purposes only. Those skilled in the art will appreciate that various modifications, additions and substitutions are possible, without departing from the scope and spirit of the invention. Therefore, it is obvious that the modifications, additions and substitutions are within the scope of the present invention.

EXAMPLE (A-1) ABS graft copolymer: DP270 manufactured by LG chemistry
(A-2) ASA graft copolymer: SA927 manufactured by LG chemistry
(B-1) MMA-α-methyl styrene-acrylonitrile copolymer: 290UH manufactured by LG chemistry
(B-2) α-methyl styrene-acrylonitrile copolymer: 200UH manufactured by LG chemistry
(B-3) PMI-based heat resistant resin: MSNI manufactured by DENKA
(C-1) SAN copolymer: 81HF (acrylonitrile content: 24% by weight) manufactured by LG chemistry
(C-2) SAN copolymer: 97HC (acrylonitrile content: 30.5% by weight) manufactured by LG chemistry
(C-3) SAN copolymer: 92RF (acrylonitrile content: 28% by weight) manufactured by LG chemistry
(D) Polyetherester elastomer (TPEE): KEYFLEX BT2140D (melt index (230° C., 2.16 kg): 5 g/10 min, Shore D hardness: 40D) manufactured by LG chemistry Modified polyester resin (E)(PETG): JIN100 manufactured by SK Chemical (F) PEO/PPO/PEO copolymer: Pluronic F68 manufactured by BASF (G) Bulk-polymerized ABS copolymer: ER400 manufactured by LG chemistry Examples 1 to 7 and Comparative Examples 1 to 14

Components summarized in Tables 1 to 3 below were kneaded and extruded in contents summarized in the tables under conditions of an extrusion temperature of 250° C., a feed rate of 25 kg/hr, and a screw speed of 600 rpm in an extruder (SM Twin screw extruder, 25Φ), thereby manufacturing pellets. The manufactured pellets were subjected to melt flow index measurement. In addition, the manufactured pellets were used to manufacture injection specimens using an injection machine (120MT manufactured by ENGEL) under conditions of an injection temperature of 240° C., a molding temperature of 60° C. and an injection speed of 30 mm/min.

Test Example

The characteristics of the pellets and injection specimens manufactured according to Examples 1 to 7 and Comparative Examples 1 to 14 were measured according to the following methods. Results are summarized in Tables 1 to 3 below.

Charpy impact strength (kJ/m$^2$): A specimen having a thickness of 4 mm was notched according to ISO 179/1eA to measure Charpy impact strength.

Melt flow index (MFI, g/10 min): Measured under conditions of 220° C. and 10 kg according to ISO 1133.

Tensile strength (MPa): Measured using a specimen having a thickness of 4 mm under a condition of 50 mm/min according to ISO 527.

Chemical resistance: A specimen having a size of 160*10*4 mm was fixed to a curved jig having 2.0% strain, and a fragrance, Aroma Natural (product name), manufactured by Amway was applied in an amount of 0.1 cc thereto, followed by measuring a time at which the specimen was cracked. When cracks were not generated after 24 hours elapsed, it was recorded as 1 day.

TABLE 1

| Classification | Example 1 | Example 2 | Example 3 | Example 4 | Example 5 | Example 6 | Example 7 |
|---|---|---|---|---|---|---|---|
| (A-1) DP270 | 25 | 25 | 20 | 25 | 30 | 20 | 30 |
| (A-2) SA927 | | | | | | | |
| (B-1) 290UH | 25 | 40 | 25 | 25 | 25 | 35 | 50 |
| (B-2) 200UH | | | | | | | |
| (B-3) MSNI | | | | | | | |
| (C-1) 81HF | 40 | 25 | 45 | 40 | 45 | 35 | 20 |
| (C-2) 97HC | | | | | | | |
| (C-3) 92RF | | | | | | | |
| (G) ER400 | 10 | 10 | 10 | 10 | | 10 | |
| (D) KEYFLEX BT2140D | 13 | 13 | 10 | 13 | 13 | 10 | 13 |
| (E) PETG | 5 | 5 | 5 | 2 | 5 | 5 | 5 |
| (F) Pluronic F68 | 1 | 1 | 1 | 1 | 1 | 1 | 1 |
| Properties | | | | | | | |
| Charpy impact strength | 32 | 30 | 28 | 28 | 34 | 26 | 32 |
| MFI | 23 | 16 | 24 | 24 | 20 | 22 | 15 |
| Tensile strength | 41 | 40 | 41 | 41 | 39 | 40 | 38 |
| Chemical resistance | 1 day | 1 day | 1 day | 1 day | 1 day | 1 day | 1 day |

TABLE 2

| Classification | Comparative Example 1 | Comparative Example 2 | Comparative Example 3 | Comparative Example 4 | Comparative Example 5 | Comparative Example 6 |
|---|---|---|---|---|---|---|
| (A-1) DP270 | 25 | 25 | | | 25 | 25 |
| (A-2) SA927 | | | 25 | 30 | | |
| (B-1) 290UH | 25 | 25 | | | | |
| (B-2) 200UH | | | 25 | 25 | 40 | |
| (B-3) MSNI | | | | | | 10 |
| (C-1) 81HF | | | 40 | 35 | 25 | 55 |
| (C-2) 97HC | 40 | | | | | |
| (C-3) 92RF | | 40 | | | | |
| (G) ER400 | 10 | 10 | 10 | 10 | 10 | 10 |
| (D) KEYFLEX BT2140D | 13 | 13 | 13 | 13 | 13 | 13 |

TABLE 2-continued

| Classification | Comparative Example 1 | Comparative Example 2 | Comparative Example 3 | Comparative Example 4 | Comparative Example 5 | Comparative Example 6 |
|---|---|---|---|---|---|---|
| (E) PETG | 5 | 5 | 5 | 5 | 5 | 5 |
| (F) Pluronic F68 | 1 | 1 | 1 | 1 | 1 | 1 |
| Properties | | | | | | |
| Charpy impact strength | 25 | 24 | 16 | 19 | 33 | 27 |
| MFI | 11 | 17 | 15 | 13 | 21 | 23 |
| Tensile strength | 43 | 41 | 43 | 41 | 42 | 41 |
| Chemical resistance | 1 min | 1 min | 1 min | 15 min | 1 min | 1 min |

TABLE 3

| Classification | Comparative Example 7 | Comparative Example 8 | Comparative Example 9 | Comparative Example 10 | Comparative Example 11 | Comparative Example 12 | Comparative Example 13 | Comparative Example 14 |
|---|---|---|---|---|---|---|---|---|
| (A-1) DP270 | 25 | 30 | 20 | 35 | 25 | 25 | 25 | 25 |
| (A-2) SA927 | | | | | | | | |
| (B-1) 290UH | 25 | 10 | 55 | 45 | 25 | 25 | 25 | 25 |
| (B-2) 200UH | | | | | | | | |
| (B-3) MSNI | | | | | | | | |
| (C-1) 81HF | 40 | 45 | 15 | 5 | 40 | 40 | 40 | 40 |
| (C-2) 97HC | | | | | | | | |
| (C-3) 92RF | | | | | | | | |
| (G) ER400 | 10 | 15 | 10 | 15 | 10 | 10 | 10 | 10 |
| (D) KEYFLEX BT2140D | 4 | 13 | 13 | 13 | 22 | 13 | 0 | 13 |
| (E) PETG | 5 | 5 | 5 | 5 | 5 | 0.1 | 5 | 0 |
| (F) Pluronic F68 | 1 | 1 | 1 | 1 | 1 | 1 | 1 | 1 |
| Properties | | | | | | | | |
| Charpy impact strength | 28 | 36 | 30 | 40 | 40 | 27 | 26 | 28 |
| MFI | 20 | 25 | 12 | 17 | 13 | 23 | 24 | 22 |
| Tensile strength | 40 | 41 | 40 | 37 | 35 | 40 | 41 | 40 |
| Chemical resistance | 1 min | 10 min | 1 day | 15 min | 1 day | 10 min | 1 min | 10 min |

(In Tables 1 to 3, the content of each of (A-1), (A-2), (B-1), (B-2), (B-3), (C-1), (C-2), (C-3) and (G) is % by weight based on a total weight of the components, and the content of each of (D), (E) and (F) is part by weight based on 100 parts by weight as a total weight of (A-1), (A-2), (B-1), (B-2), (B-3), (C-1), (C-2), (C-3) and (G).) As summarized in Tables 1 to 3, it was confirmed that the thermoplastic resin compositions (Examples 1 to 7) according to the present invention exhibited superior Charpy impact strength, melt flow index, and tensile strength and excellent chemical resistance, compared to Comparative Examples 1 to 14.

Specifically, in the case of Comparative Examples 1 and 2 in which the content of acrylonitrile in the SAN copolymer (C) is 30.5% by weight or 28% by weight, chemical resistance became poor.

In addition, in the case of Comparative Examples 3 and 4 including an ASA graft copolymer (A-2) and an α-methyl styrene-acrylonitrile copolymer (B-2), Charpy impact strength, melt flow index and chemical resistance became poor.

In addition, in the case of Comparative Examples 5 and 6 including an α-methyl styrene-acrylonitrile copolymer (B-2) or a PMI-based heat resistant resin (B-3), chemical resistance was decreased.

In addition, in the case of Comparative Examples 7, 8, 10 and 12 in which a polyether ester elastomer resin (D), an MMA-α-methyl styrene-acrylonitrile copolymer (B-1), an SAN copolymer (C-1), and a modified polyester resin (E) were respectively included in an amount less than the ranges of the present invention, chemical resistance became poor.

In addition, in the case of Comparative Example 11 in which a polyether ester elastomer resin (D) was included in an amount exceeding the range of the present invention, a melt flow index and tensile strength were decreased.

Further, in both Comparative Example 13 excluding the polyether ester elastomer resin (D) and Comparative Example 14 excluding the modified polyester resin (E), chemical resistance became poor.

In conclusion, it was confirmed that when content ratios of a polyether ester elastomer resin and a modified polyester resin to the base resin according to the present invention including a vinyl cyanide compound-conjugated diene compound-aromatic vinyl compound graft copolymer, a (meth)acrylic acid alkyl ester compound-α-methyl styrene-based compound-vinyl cyanide compound copolymer, and an aromatic vinyl compound-vinyl cyanide compound copolymer including a predetermined content of vinyl cyanide compound in predetermined contents are adjusted to predetermined ratios, superior mechanical properties, fluidity and chemical resistance are exhibited.

The invention claimed is:

1. A thermoplastic resin composition, comprising:
    a base resin;
    7 to 17 parts by weight of a polyether ester elastomer resin (D) based on 100% by weight of the base resin; and
    1.1 to 10 parts by weight of a modified polyester resin (E) based on 100% by weight of the base resin,
    wherein the base resin comprises:
        10 to 40% by weight of a vinyl cyanide compound-conjugated diene compound-aromatic vinyl compound graft copolymer (A);
        18 to 52% by weight of a (meth)acrylic acid alkyl ester compound-α-methyl styrene-based compound-vinyl cyanide compound copolymer (B); and
        13 to 55% by weight of an aromatic vinyl compound-vinyl cyanide compound copolymer (C),
    wherein the aromatic vinyl compound-vinyl cyanide compound copolymer (C) comprises 10 to 25% by weight of a vinyl cyanide compound.

2. The thermoplastic resin composition according to claim 1, wherein the graft copolymer (A) comprises 45 to 75% by weight of a conjugated diene rubber comprising a conjugated diene compound and having an average particle diameter of 0.2 to 0.5 μm; 15 to 45% by weight of an aromatic vinyl compound; and 1 to 25% by weight of a vinyl cyanide compound.

3. The thermoplastic resin composition according to claim 1, wherein the (meth)acrylic acid alkyl ester compound-α-methyl styrene-based compound-vinyl cyanide compound copolymer (B) comprises 35 to 60% by weight of a (meth)acrylic acid alkyl ester compound; 30 to 50% by weight of an α-methyl styrene-based compound; and 10 to 20% by weight of a vinyl cyanide compound.

4. The thermoplastic resin composition according to claim 1, wherein the polyether ester elastomer resin (D) has a melt index of 0.1 to 10 g/10 min, which is measured under conditions of 230° C. and 2.16 kg according to ASTM D1238.

5. The thermoplastic resin composition according to claim 1, wherein the polyether ester elastomer resin (D) is obtained by melt-polymerizing an aromatic dicarboxylic acid or an ester-forming derivative thereof; an aliphatic diol; and a polyalkylene oxide, followed by solid-state-polymerizing a resultant product.

6. The thermoplastic resin composition according to claim 1, wherein the modified polyester resin (E) comprises 50% by weight or more of a 1,4-cyclohexanedimethanol-derived unit.

7. The thermoplastic resin composition according to claim 1, wherein the base resin comprises bulk-polymerized vinyl cyanide compound-conjugated diene compound-aromatic vinyl compound copolymer (G) in an amount of 1 to 20% by weight based on a total weight of a sum of the graft copolymer (A), the copolymer (B), the copolymer (C), and the bulk-polymerized vinyl cyanide compound-conjugated diene compound-aromatic vinyl compound copolymer (G).

8. The thermoplastic resin composition according to claim 7, wherein the bulk-polymerized vinyl cyanide compound-conjugated diene compound-aromatic vinyl compound copolymer (G) is prepared by bulk-polymerizing 5 to 20% by weight of a conjugated diene rubber comprising a conjugated diene compound; 55 to 85% by weight of an aromatic vinyl compound; and 5 to 25% by weight of a vinyl cyanide compound.

9. The thermoplastic resin composition according to claim 1, wherein the thermoplastic resin composition comprises an alkylene oxide copolymer (F) is comprised in an amount of 0.3 to 5 parts by weight based on 100 parts by weight of the base resin.

10. The thermoplastic resin composition according to claim 1, wherein, in chemical resistance evaluation of fixing a specimen made of the thermoplastic resin composition and having a size of 160*10*4 mm to a curved jig having 2.0% strain, and applying a fragrance in an amount of 0.1 cc to the specimen, followed by measuring a time at which the specimen is cracked, no crack is generated in the specimen even after 24 hours.

11. The thermoplastic resin composition according to claim 1, wherein a specimen made of the thermoplastic resin composition having a thickness of 4 mm and notched according to ISO 179/1eA has a Charpy impact strength of 26 kJ/m$^2$ or more.

12. The thermoplastic resin composition according to claim 1, wherein the thermoplastic resin composition has a melt flow index (MFI) of 15 g/10 min or more, which is measured under conditions of 220° C. and 10 kg according to ISO 1133.

13. A method of preparing a thermoplastic resin composition, the method comprising:
    kneading and extruding a base resin;
    7 to 17 parts by weight of a polyether ester elastomer resin (D) based on 100% by weight of the base resin; and
    1.1 to 10 parts by weight of a modified polyester resin (E), under conditions of 200 to 300° C. and 200 to 700 rpm based on 100% by weight of the base resin,
    the base resin comprising: 10 to 40% by weight of a vinyl cyanide compound-conjugated diene compound-aromatic vinyl compound graft copolymer (A); 18 to 52% by weight of a (meth)acrylic acid alkyl ester compound-α-methyl styrene-based compound-vinyl cyanide compound copolymer (B); and 13 to 55% by weight of an aromatic vinyl compound-vinyl cyanide compound copolymer (C),
    wherein the aromatic vinyl compound-vinyl cyanide compound copolymer (C) comprises 10 to 25% by weight of a vinyl cyanide compound.

14. A molded article, comprising the thermoplastic resin composition according to claim 1.

* * * * *